(12) United States Patent
Schmider et al.

(10) Patent No.: US 6,429,615 B2
(45) Date of Patent: *Aug. 6, 2002

(54) ELECTRONICALLY COMMUTATED DC MOTOR

(75) Inventors: Fritz Schmider, Homberg; Stefan Lukenich, Singen, both of (DE)

(73) Assignee: Papst Motoren GmbH & Co. KG, St. Georgen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/729,377

(22) Filed: Dec. 4, 2000

(30) Foreign Application Priority Data

Dec. 8, 1999 (DE) ..................... 299 21 580 U

(51) Int. Cl.$^7$ .................................. H02P 7/06
(52) U.S. Cl. .................. 318/254; 318/439; 318/138
(58) Field of Search ................. 318/700, 701, 318/434, 138, 254, 439

(56) References Cited

U.S. PATENT DOCUMENTS

| | | | | |
|---|---|---|---|---|
| 3,801,887 A | * | 4/1974 | Allard | 318/138 |
| 4,156,168 A | | 5/1979 | Vogel | 318/254 |
| 4,162,435 A | * | 7/1979 | Wright | 318/138 |
| 4,275,343 A | * | 6/1981 | Fulton et al. | 318/721 |
| 4,401,926 A | * | 8/1983 | Morton et al. | 318/376 |
| 4,459,519 A | * | 7/1984 | Erdman | 318/254 |
| 4,459,532 A | * | 7/1984 | Schutten et al. | 318/781 |
| 4,520,303 A | * | 5/1985 | Ward | 318/728 |
| 4,868,479 A | * | 9/1989 | Byong-Ho et al. | 318/721 |
| 4,874,993 A | | 10/1989 | Tanaka | 318/254 |
| 5,652,825 A | * | 7/1997 | Schmider et al. | 388/822 |
| 5,682,088 A | | 10/1997 | Sonnek | 318/254 |
| 5,831,359 A | | 11/1998 | Jeske | 310/68 B |
| 6,013,966 A | | 1/2000 | Fehrenbacher | 310/257 |

FOREIGN PATENT DOCUMENTS

| | | |
|---|---|---|
| DE | 2 311 398 | 9/1974 |
| DE | 23 39 077 | 2/1975 |
| DE | 87 02 271.0 U | 7/1987 |
| DE | 295 01 695.7 | 7/1995 |
| DE | 44 38 569 C2 | 5/1996 |
| DE | 296 16 169 U1 | 1/1997 |
| DE | 198 26 458 A1 | 12/1999 |
| EP | 0 316 077 A1 | 5/1989 |
| EP | 0 908 630 A1 | 4/1999 |
| EP | 0 957 570 A2 | 5/1999 |

OTHER PUBLICATIONS

Derwent WPI English abstract of DE 87–02271–U, publ. Jul. 16, 1987.
Derwent WPI English abstract of DE 295 01 695–U, publ. Aug. 9, 1995.
Derwent WPI English abstract of DE 44 38 569–C2, Baumann+/Bosch, published May 2, 1996.
Derwent WPI English abstract of EP 0 957 570–A2, Zeh+Oljaca/Ako–Werke, publ. Nov. 17, 1999.
Derwent WPI English abstract of DE 23 39 077–A, Moczala, published Feb. 13, 1975.
Derwent WPI English abstract of DE 23 11 398–A, Fichter/Kienzle, published Sep. 12, 1974.

* cited by examiner

Primary Examiner—Robert E. Nappi
Assistant Examiner—Rina I. Duda
(74) Attorney, Agent, or Firm—Milton Oliver; Ware, Fressola, Van Der Sluys & Adolphson LLP

(57) ABSTRACT

An electronically commutated motor (4) has a permanent-magnet rotor (28) and has a stator (14) that has two winding phases (25, 26). During one rotor rotation of 360° el., firstly current is delivered to the one winding phase (25) within a first rotation angle range via an associated first semiconductor switch (68); and within a subsequent second rotation angle range, current is delivered to the other winding phase (26) via an associated second semiconductor switch (70). The motor further has a commutation apparatus for alternatingly switching ON the first semiconductor switch (68) and the second semiconductor switch (70). This commutation apparatus comprises a bistable multivibrator (FF90) whose switching state is controlled, via at least one comparator (126, 128), by the voltage that is induced by the permanent-magnet rotor (28) in that winding phase (25 or 26) which is currentless at that instant and which, in the instantaneous rotation angle range of the rotor (28), is not being supplied with current via its associated semiconductor switch (68 or 70).

25 Claims, 5 Drawing Sheets

ELECTRONICALLY COMMUTATED DC MOTOR

FIELD OF THE INVENTION

The invention relates generally to an electronically commutated DC motor (ECM), particularly one adapted to drive a fan.

BACKGROUND

Motors of this kind are used, inter alia, to drive miniature fans (cf. EP-A1-0 908 630 and corresponding U.S. Pat. No. 6,013,966, FEHRENBACHER) . For various reasons, it may be desirable to operate such a motor without a Hall generator, i.e. to commutate it with the voltage that is induced, during operation, by the rotor in the stator winding.

SUMMARY OF THE INVENTION

One object of the invention is therefore to provide a new electronically commutated motor.

In accordance with the invention, the current in the motor is controlled using a bistable multivibrator whose switching state is controlled via at least one comparator. The comparator is in turn controlled by the voltage that is induced by the permanent-magnet rotor in a winding phase that is currentless at that instant. Because a separate rotor position sensor is eliminated, a motor of this kind has a simple configuration with good efficiency, since the power consumption for a rotor position sensor is eliminated. The invention is therefore particularly advantageous for miniature and subminiature motors in which the power consumption of a rotor position sensor, for example a Hall IC, would greatly reduce the electrical efficiency, and it is highly suitable, for example, for motors in which the electronic components are arranged separately from the actual motor (stator with stator winding, and rotor).

Further details and advantageous developments of the invention are evident from the exemplary embodiment described below and depicted in the drawings, which is in no way to be understood as a limitation of the invention.

BRIEF FIGURE DESCRIPTION

Figure 7:
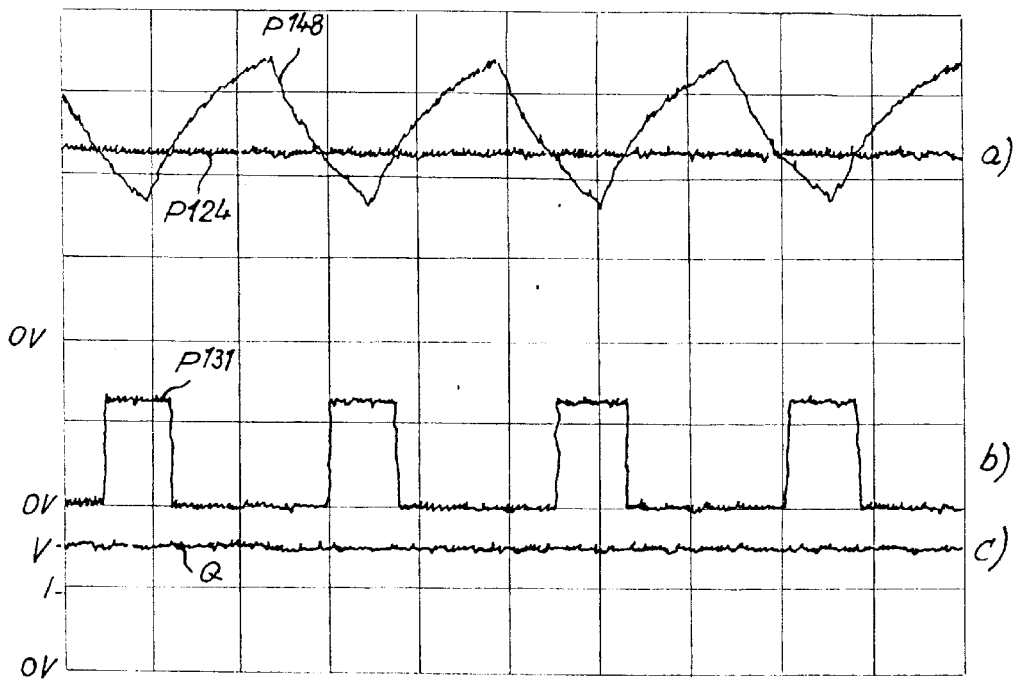
Figure 8:
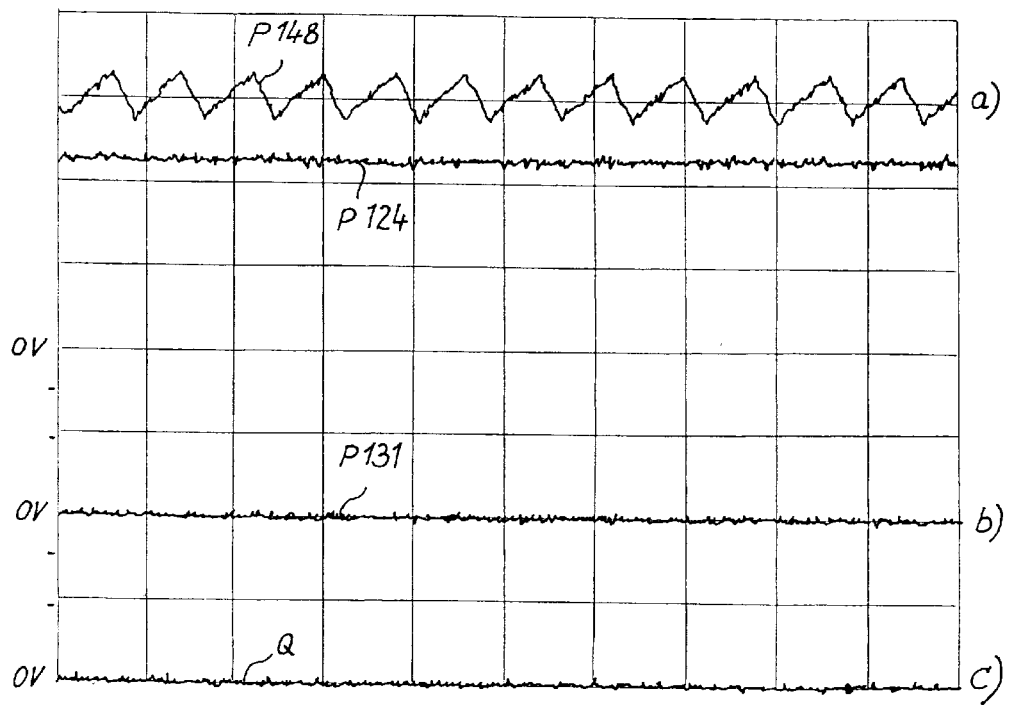

FIG. 7 is a set of graphs (a)–(c) showing the manner in which, when motor 4 is rotating, a signal is generated, at a signal output 180, which indicates the rotation of the motor; and FIG. 8 shows the manner in which, when motor 4 is jammed or blocked from rotation, a signal is generated at a signal output 180, which indicates that the motor is not rotating.

DETAILED DESCRIPTION OF A PREFERRED EMBODIMENT

Figure 1:
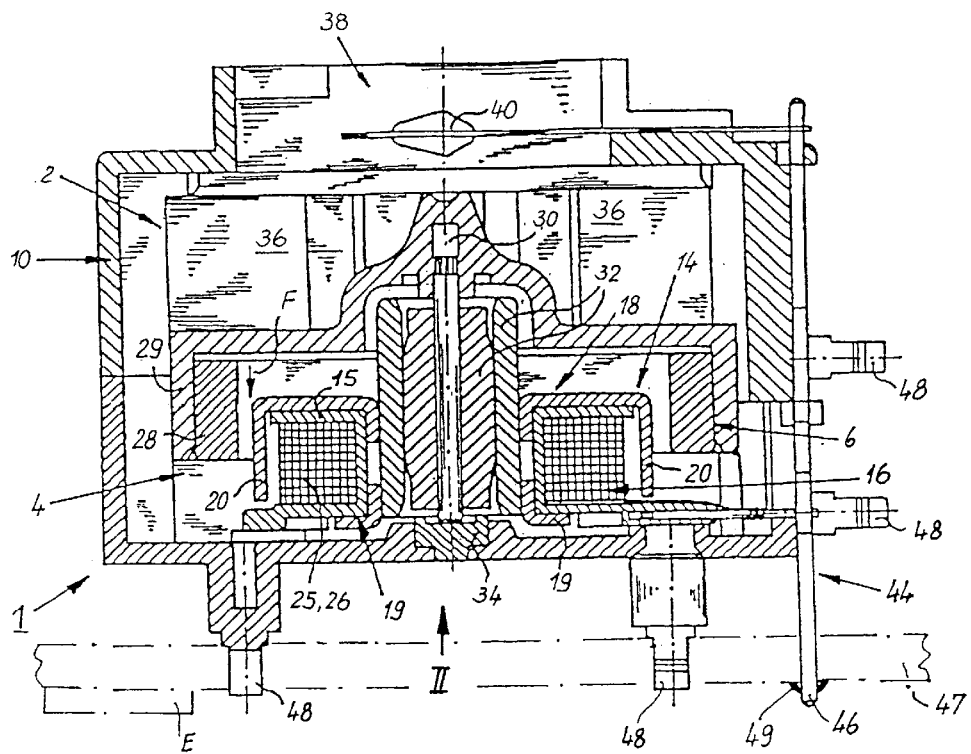
FIG. 1 is a longitudinal section through a fan 1 that is driven by an electronically commutated motor 4, shown greatly enlarged.
Figure 2:
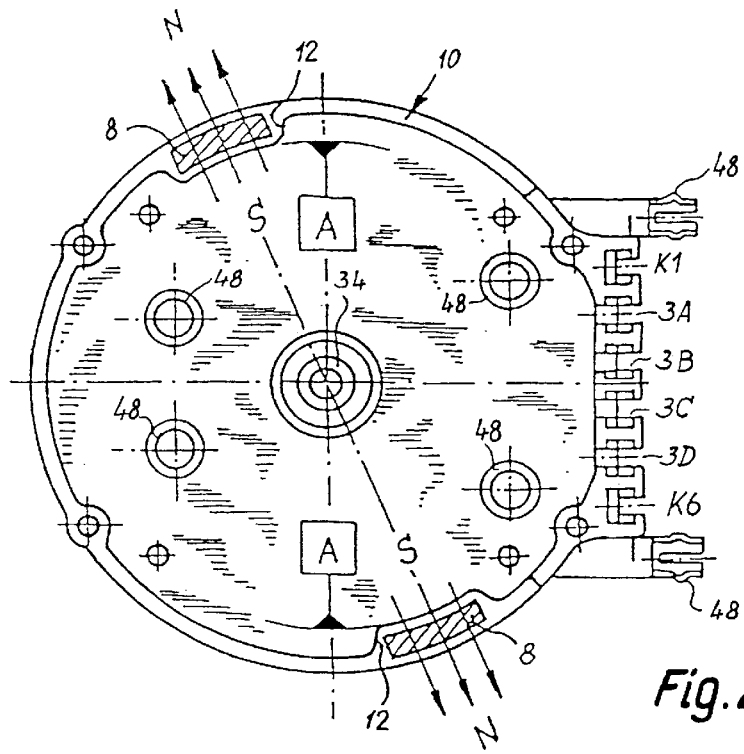
FIG. 2 is a plan view of the fan of FIG. 1, viewed in the direction of arrow II of FIG. 1.

FIGS. 1 and 2 show, purely by way of example, a radial fan 1 as known from EP 0 908 630-A1 and its corresponding U.S. Pat. No. 6,013,966, FEHRENBACHER et al. This has a fan wheel 2 and an electronically commutated externalrotor claw pole motor 4 which directly drives fan wheel 2. Motor 4 has a permanent-magnet external rotor 6. As shown in FIG. 2, two diametrically opposite positioning magnets 8 are provided; when motor 4 is at a standstill, there rotate rotor 6 into a preferred position (also called the "starting position") from which it can easily start up. Magnets 8 are arranged in pockets 12 of fan housing 10.

Figure 3:
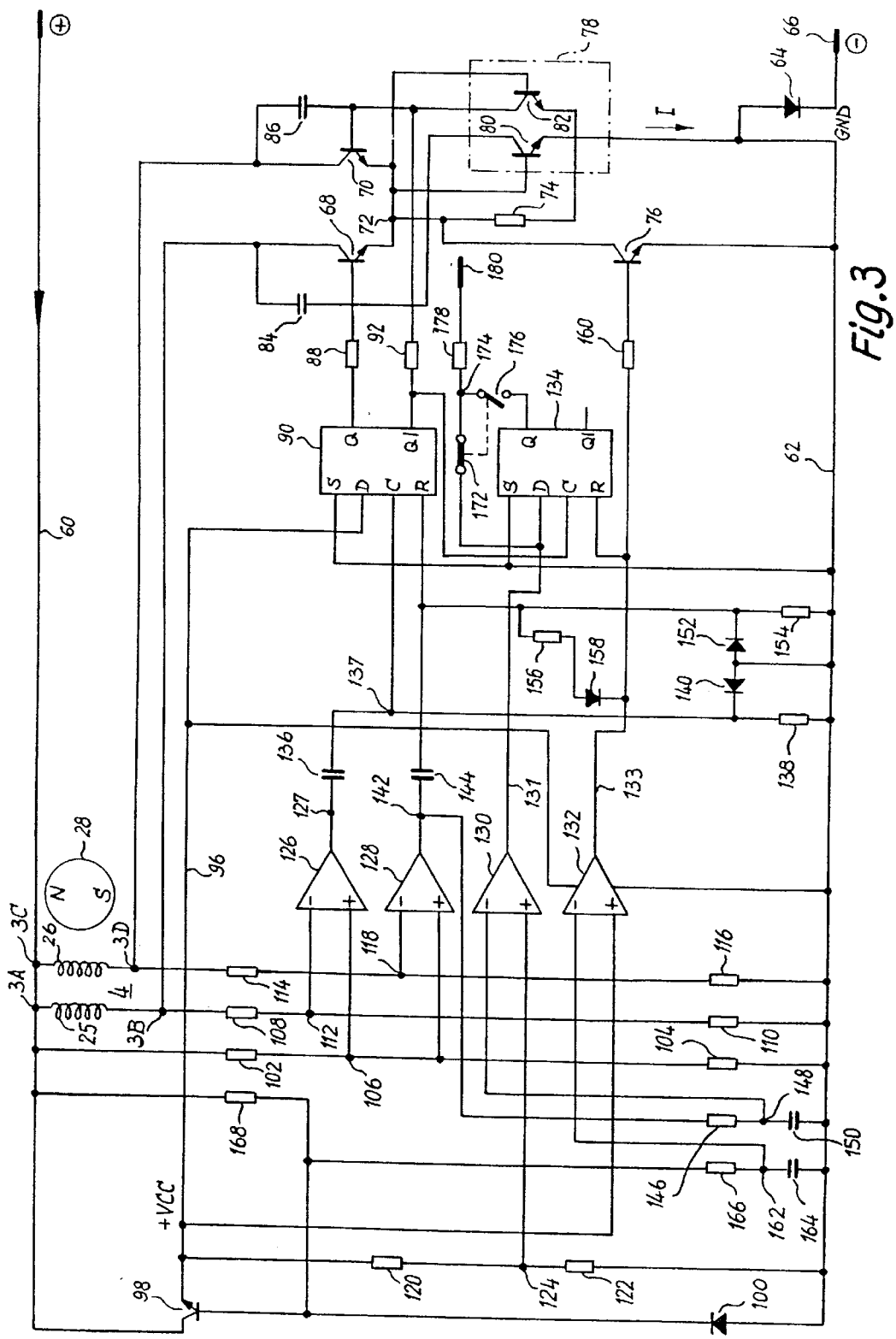
FIG. 3 shows a preferred exemplary embodiment of a circuit for operating the motor shown in FIGS. 1 and 2.

Motor 4 has a stator 14 with two opposing claw-pole pieces 18, 19 between which, as shown, is located an annular winding 16 on a coil former 15. Winding 16 is wound in bifilar fashion and has two winding phases 25 and 26 with (preferably) identical numbers of turns. These phases are also shown in FIG. 3. They are inductively coupled by reason of the configuration of the motor.

Figure 5:
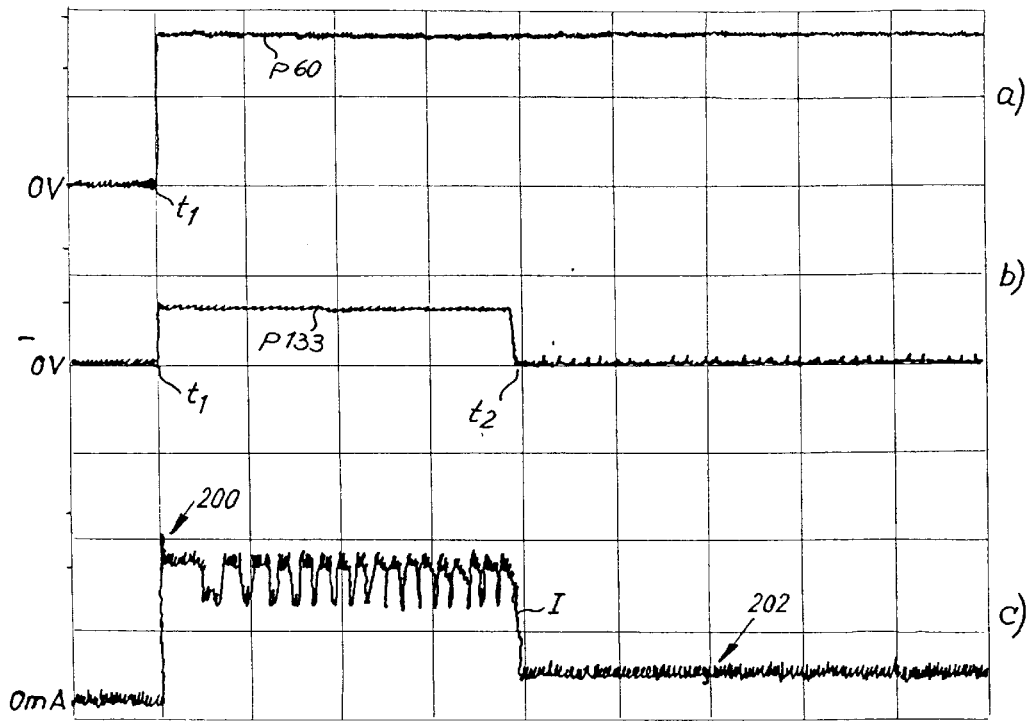
FIG. 5 is another set of graphs (a)–(c), showing signals that occur when a motor according to FIGS. 1 through 3 starts up.
Figure 6:
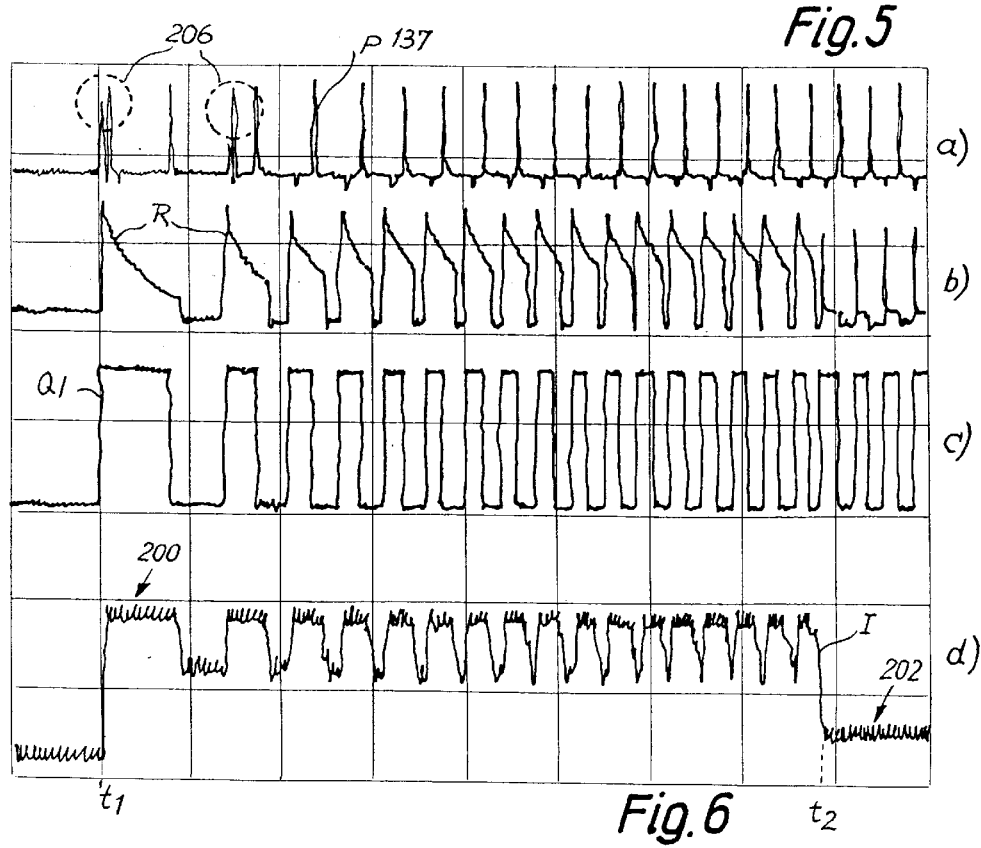
FIG. 6 is a set of graphs (a)–(d), which illustrate startup commutation and the signals occurring in that context.

Phase 25 has two terminals 3A and 3B which are shown in FIGS. 2 and 3, and phase 26 has two terminals 3C and 3D. Phase 26 is preferably wound with a thicker wire than phase 25, for which reason phase 26 has a resistance that is at least 10% lower than the resistance of phase 25, so that a higher starting current is possible through phase 26 than through phase 25, as shown in FIGS. 5 and 6 at 200. Phase 26 preferably has approximately half the resistance of phase 25, for example 130 Ω compared to 260 Ω, respectively.

Claw-pole pieces 18, 19 have claw poles 20 which extend in an axial direction (cf. FIG. 1). The rotor magnet is labeled 28, and can be a so-called "rubber magnet," i.e. a mixture of rubber and hard ferrite. It is located in a support piece 29 that is configured integrally with fan wheel 2 and in which a shaft 30 is also mounted. The latter runs in a radial plain bearing 32, and its free end is axially braced against a thrust bearing 34. Rotor 6 is axially offset with respect to stator 14 in order to generate a force F directed toward bearing 34.

Fan wheel 2 has radially extending fan blades 36. An axial air intake opening is labeled 38. Located in it is an NTC (Negative Temperature Coefficient) resistor 40 that serves as a temperature sensor and is connected to two terminals K1 and K6 (FIG. 2).

Terminals K1, K6, and 3A through 3D extend axially downward in the form of elongated pins 44 whose lower ends 46 can be soldered, as shown at 49, onto a circuit board 47 indicated with dot-dash lines. Mounts 48 for attaching fan 1 are also provided. With these mounts, the fan can be attached, for example, to circuit board 47.

Fans of this kind are particularly suitable for use as so-called "circuit board fans," i.e. for direct placement on a circuit board in order to cool components present thereon. Reference is made to EP 0 908 630-A1 and to corresponding U.S. Pat. No. 6,013,966, FEHRENBACHER et al., for further details.

The electronic components E for operation of such a fan are often mounted by the customer on his own circuit board 47, as symbolically indicated in FIG. 1, and the customer purchases only a "naked" fan 1 and installs it on his circuit board, so that an operable motor is created only by such installation. This kind of motor "manufacture" generally makes it impossible to use rotor position sensors, for example a Hall generator, which is otherwise often used in electronically commutated motors to control commutation.

Since rotor magnet 28 is located, because of the effect of stationary magnets 8, in a predetermined staring position or in one of a plurality of predetermined starting positions when motor 4 starts, a predetermined winding phase of stator winding 16 must receive a starting current in a predetermined direction upon switching on. The circuit shown in FIG. 3 serves to switch on this starting current. As a result of this starting current, rotor magnet 28 is caused to rotate in the desired direction and thereby induces voltages in the two winding phases 25 and 26; these voltages, after suitable pulse shaping, cause commutation of the current through the two winding phases 25 and 26. This is also referred to as "commutation with the induced voltage."

Instead of the motor disclosed in EP 0 908 030-A1 and U.S. Pat. No. 6,013,966, it is of course possible to use, for example, a motor as disclosed in Papst German Utility Models DE 295 01 695,7-U1 or in DE 87 02 271,0-U1. FIGS. 1 and 2 thus represent only a preferred exemplary embodiment whose purpose is to allow a better comprehension of the invention since, without such an example, the invention might possibly be difficult to understand.

FIG. 3 is a circuit diagram, according to a preferred embodiment of the invention, of a circuit which provides electronic commutation of the motor shown in FIGS. 1 and 2.

Winding phase 25 is connected with its terminal 3A to a positive line 60, which is usually supplied, by the battery (not shown) of a motor vehicle, with a voltage of between 8 and 16 V. A negative line 62 is connected via a diode 64 to a negative terminal 66. Diode 64 prevents damage to fan 1 in the event voltage is applied with the wrong polarity. Terminal 3B of winding phase 25 is connected to the collector of an npn transistor 68.

In the same fashion, winding phase 26 is connected at its terminal 3C to positive line 60 and at its terminal 3D to the collector of an npn transistor 70. The emitters of transistors 68 and 70 are connected to a node 72, and the latter is connected via a common emitter resistor 74 to negative line 62. Connected in parallel with resistor 74 is an npn transistor 76 that, at startup, bypasses resistor 74 for a short period t1 to t2 (FIGS. 5 and 6), e.g. for 0.4 s, in order to achieve a high starting current 200 and thereby reliable starting of motor 4. This is described below with reference to FIGS. 5 and 6.

Associated with transistors 68, 70 is a current limiter 78 which limits the current in resistor 74 to a specific value, for example to 15 mA. Current limiter 78 has two npn transistors 80, 82 whose emitters are connected to negative line 62 and whose bases are connected to node 72. The collector of transistor 80 is connected to the base of transistor 68, and the collector of transistor 82 to the base of transistor 70. In the case of transistor 68, a capacitor 84 is inserted between collector and base, and in the case of transistor 70 a capacitor 86. The function of these "Miller capacitors" is to slow down the switchover operations.

Transistors 80, 82 are controlled by the voltage drop at emitter resistor 74. When motor current I increases, that voltage drop becomes greater, and transistors 80 and 82 thereby become more conductive, and thereby reduce the base current of transistor 68 or 70 which is conductive at that instant, thus limiting current I to a desired value that corresponds to a desired rotation speed of fan 1. That current 1 is, for example, adjustable by modifying resistor 74. Current limiter 78 also prevents differing phase currents from flowing as a result or the differing resistances of phases 25, 26, which could cause the motor to run roughly.

The base of transistor 68 is connected via a resistor 88 to output Q of a first bistable flip-flop 90 whose output Q/ is connected via a resistor 92 to the base of transistor 70. Thus either transistor 68 or transistor 70 is switched on, depending on the switch position of flip-flop 90 (cf. graphs 4f and 4g of FIG. 4, described below).

The electronic components of motor 4 are supplied, via a line 96, with a regulated voltage Vcc of, for example, 7.5 V. This is done by means of a control transistor 98, of which the base is connected via a Zener diode 100 to negative line 62, the collector to positive line 60, and the emitter to line 96.

To ensure that the various motor voltages lie in the range 0-7.5 V, they are transposed by voltage dividers into this lower voltage range.

The operating voltage at positive line 60 is transposed into the lower voltage range by a voltage divider 102, 104 having a terminal 106.

The voltage at terminal 3B is transposed into the lower voltage range by a voltage divider 108, 110 having a terminal 112.

The voltage at terminal 3D is transposed into this lower range by a voltage divider 114, 116 having a terminal 118.

In addition, the voltage Vcc at line 96 is also transposed into this lower range by a voltage divider 120, 122 having a terminal 124.

Motor 4 has four comparators 126, 128, 130, 132 which are connected to voltage Vcc, this being shown only for comparator 132.

First flip-flop 90 and a second flip-flop 134 are also connected to voltage Vcc, although for reasons of clarity this is not shown.

Comparator 126 is connected at its positive input to node or junction 106, and at its negative input to node or junction 112. Its output 127 is connected via a capacitor 136 to a node 137 that is connected directly to input C of flip-flop 90, via a resistor 138 to negative line 62, and directly to the cathode of a diode 140 whose anode is connected to negative line 62. Diode 142 becomes conductive when a negative signal occurs at node 137.

Comparator 128 is also connected at its positive input to node 106, and at its negative input to node 118. Its output 142 is connected via a capacitor 144 to the dominant reset input R of flip-flop 90, and additionally via a resistor 146 to a node 148 that is connected via a capacitor 150 to negative line 62 and directly to the negative input of comparator 130, whose positive input is connected to node 124. Node 148 is connected to the negative input of comparator 130, whose positive input is connected to node 124. The output of comparator 130 is labeled 131.

Reset input R of flip-flop 90 is connected directly to the cathode of a diode 152, and via a resistor 154 to negative line 62. The anode of diode 152 is connected to negative line 62. Reset input R of flip-flop 90 is also connected via a resistor 156 to the anode of a diode 158 whose cathode is connected to output 133 of comparator 132, to reset input R of flip-flop 134, and—via a resistor 160—to the base of transistor 76. Immediately after motor 4 is switched on, output 133 is briefly at a high potential, and during that period inhibits or blocks diode 158.

The positive input of comparator 132 is connected to line 96 (voltage Vcc), and the negative input to a node 162 that is connected via a capacitor 164 to negative line 62 and via a resistor 166 to the base of transistor 98, which in turn is connected via a resistor 168 to positive line 60.

Terminal D of flip-flop 90 is connected to line 96, and terminal S of both flip-flops 90, 134 to negative line 62. Terminal C of flip-flop 134 is connected to output Q/ of flip-flop 90. Output 131 of comparator 130 is connected to input D of flip-flop 134. Input R of flip-flop 134 is connected to output 133 of comparator 132. Input D of flip-flop 134 is connected via a switch 172 to a node 174 that is connected via a switch 176 to output Q of flip-flop 134 and via a resistor 178 to a terminal 180 at which is obtained, during operation, a diagnostic signal indicating whether rotor 28 is rotating or is stationary. This is explained below with reference to FIGS. 7 and 8. Switches 172, 176 are coupled to one another in the manner shown, i.e. either switch 172 is closed and switch 176 is open, or vice versa.

| Preferred values for FIG. 3 | |
|---|---|
| Operating voltage | 8–16 V |
| Motor current I in continuous operation | 15 mA |
| Phase 25 | 260 Ω |
| Phase 26 | 130 Ω |
| The two phases have the same number of turns and are magnetically coupled. The values refer to a motor of the same type as the claw pole motor shown. | |
| Transistors 76, 80, 82, 98 | BC847BS |
| Transistors 68, 70 | BC817-40 |
| Flip-flops 90, 134 | MC14013BD |
| Comparators 126, 128, 130, 132 | LM2902D |
| Zener diode 100 | BZX284C8V2 |
| Diode 64 | BAS216 |
| Diodes 140, 152, 158 | BAW56S |
| Resistor 120 | 68 kΩ |
| Resistor 122 | 33 kΩ |
| Resistors 102, 108, 114, 168 | 47 kΩ |
| Resistors 138, 146, 154, 166 | 1 MΩ |
| Resistors 104, 110, 116, 156 | 20 kΩ |
| Resistor 74 | 39 Ω |
| Resistors 88, 92, 160, 178 | 10 kΩ |
| Capacitor 136 | 1 nF |
| Capacitor 144 | 22 nF |
| Capacitors 84, 86 | 100 nF |
| Capacitor 164 | 220 nF |
| Capacitor 150 | 4.7 nF |

These values are, of course, to be understood as only exemplary.

Mode of Operation

Voltage dividers 102, 104 and 109, 110 and 114, 116 cause the voltages on positive line 60 and at winding phases 25, 26 to be divide down uniformly to values that lie below voltage Vcc, i.e., for example in the range 0 to 7.5 V. The result is to create images, of the winding voltages and of the operating voltage, which lie within the working range of comparators 126, 128, 130, 132.

Figure 4:
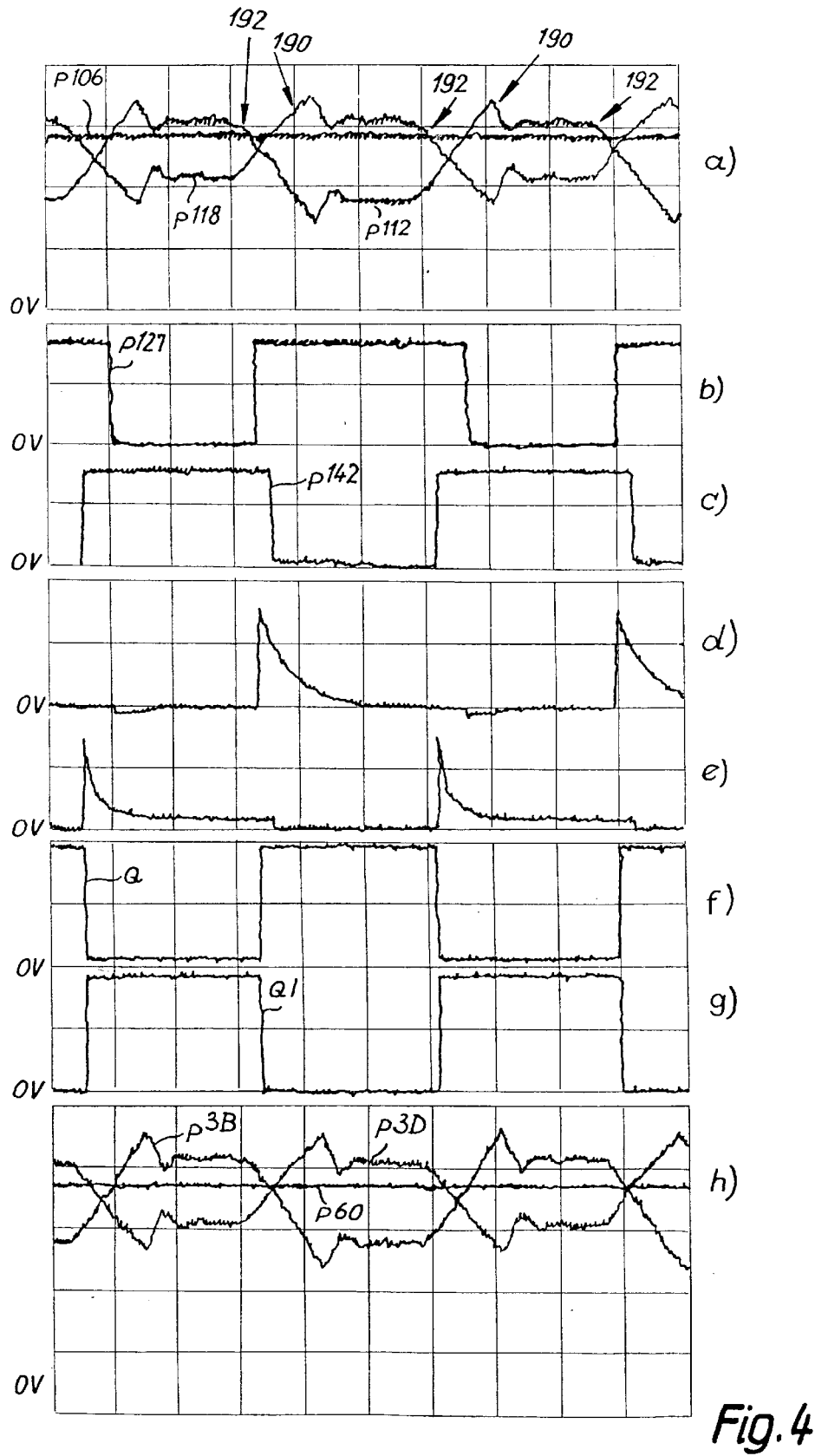
FIG. 4 is a set of graphs (a)–(h), drawn to a common time scale, showing various signals that occur during operation in the circuit of FIG. 3.

In FIG. 4, graph (a), p106 designates the potential at junction 106 (FIG. 3), p112 designates the potential at junction 112 (which is an image of the voltage on winding phase 25), and p118 the potential at junction 118 (Which is an image of the voltage on winding phase 26).

Comparator 126 detects the zero crossings of potential p112, and comparator 128 detects the zero crossings of potential p118.

What is utilized, in this context, is the fact that the positive half-waves of potentials p112 and p118 correspond, in each case, to the currentless state of the respective winding phase 25 or 26, while the negative half-waves occur when current is flowing through the respective phase.

Because of the close transformer-type coupling of phases 25, 26, switching on one phase also has an effect on the voltage at the other phase, which results, in the case of the rising positive edge, in voltage spikes 190. These signal portions are therefore unsuitable for controlling commutation. Measurement is instead performed at the falling edge 192, and the zero crossing for commutation control is therefore ascertained at those falling edges 192.

FIG. 4, graph (b), shows output signal p127 at output 127 of comparator 126, FIG. 4, graph (c), shows output signal p142 at output 142 of comparator 128.

One thereby obtains square-wave signals whose phase position varies as the inverse of the measured potential. For example, the curve for p127 is the inverse of potential p112, and the curve for p142 is the inverse of potential p118.

Signal p127 is differentiated by capacitor 136 and resistor 138, the negative peaks being suppressed by diode 140. This yields the signals in FIG. 4, graph (d). Signal p142 is differentiated by capacitor 144 and resistor 154, the negative peaks being suppressed by diode 152. This yields the signals shown in FIG. 4, graph (a).

The spike pulses shown in FIG. 4, graphs (d) and (e), are then converted by flip-flop 90 into square-wave signals which are shown in FIG. 4, graphs (f) and (g). FIG. 4, graph (f), shows the signal at output Q of flip-flop 90, and FIG. 4, graph (g) shows the signal at output Q/ of flip-flop 90. Signal Q controls transistor 68, and signal Q/ transistor 70.

Current limiter 78 limits current I through the motor during operation, i.e. after the starting period, to a predefined value, e.g. to 15 mA. As a result, the potential curve p3B as shown in FIG. 4, graph (h), is obtained at point 3B, and the potential curve p3D as shown in FIG. 4, graph (h), is obtained at point 3D. For comparison, the potential at line 60 is shown as p60; this can be, for example, +16 V if the vehicle battery is fully charged. The voltage at phases 25, 26 thus alternated about a mean that is, for example, 16 V in FIG. 4 graph h.

Startup Circuit

FIG. 5, graph (a), shows that motor 4 is switched on at time t1, causing potential p60 of positive line 60 to jump from 0 V to, for example, 16 V.

This creates, at Zener diode 100 (FIG. 3), a voltage of e.g. 7.5 V, and, as a result of this, the previously-discharged capacitor 164 is charged via resistor 166. This charging process lasts approximately 400 ms, i.e. from t1 to t2, and during that time transistor 76 is kept conductive by the output signal of comparator 132. FIG. 5, graph (b), shows, in this context, potential p133 at output 133 of comparator 132, which is high between times t1 and t2 and keeps transistor 76 conductive.

FIG. 5 graph (c), shows starting motor current I, which has an elevated value during this period. (The ripple in current I during the period without current-limiting is a result of the fact that, in this motor, winding phases 25 and 26 preferably have different resistances, and without current-limiting, motor current I is substantially determined by the resistance values of phases 35, 36.)

Supplying Current to the Correct Winding at Startup

Phase 26 must be the first to receive current when switching-on occurs, since motor 28 will then start in the correct direction from its starting position, and a particularly high starting current, i.e. a particularly reliable start, is obtained. (The starting position is created by way of permanent magnets 0 shown in FIG. 2.) In the exemplary embodiment, phase 26 has a resistance of 130 Ω, and phase 25 a resistance of 260 Ω, so that starting with phase 26 results in a higher starting current; this is clearly evident from the oscillogram in FIG. 5, graph (c) at 200. Also clearly visible in FIG. 5, graph (c), at 202, is that current is limited to 15 mA after time t2, FIG. 6, graph (d) , also shows this current profile, but with greater time resolution; the same reference characters are used therein.

The fact that the starting current flows through phase 26 means that transistor 70 is caused to be conductive by an output signal at output Q/ of flip-flop 90. To ensure this, the flip-flops flops used as flip-flops 90 and 134 are ones in which one of the inputs is dominant, i.e. as long as a signal is present at that dominant input R, signals at any other input have no effect. This dominant input R is used to control phase 26, which must be the first one switched on at startup. The other phase 25 is controlled by an input C that is edge-triggered.

When dominant input R of phase 26 has switched on, interference pulses at the other input C could cause premature commutation to phase 25 and thus impede startup.

To prevent this, the signal at dominant input R is "widened" during startup, so that the dominant state is effective not only during the switching operation, but also for some time thereafter. After startup, this "pulse widening" is automatically switched off.

To ensure a reliable starting operation, the procedure is therefore as follows:

a) By way of reset input R of flip-flop 90, output O/ or flip-flop 90 is set, in statically dominant fashion, to a high value;

b) Resetting of output Q/, i.e. setting of output Q, is accomplished by way of clock input C of flip-flop 90, i.e. in edge-triggered fashion;

c) Capacitor 144 (e.g. 22 nF) is larger than capacitor 136 (e.g. 1 nF)

In addition, the positive output 133 of comparator 132 causes a different time constant to be effective during startup at reset input R of flip-flop 90, since diode 158 is inhibited at that time (as already explained). The time constant C144↓R154 is therefore effective at reset input R at startup. This constant is relatively large, and prevents the interference pulses of potential p137 at node 137 (shown at 206 in FIG. 6, graph a) from causing motor 4 to oscillate.

After completion of the starting period, output 133 of comparator 132 goes to a lower potential because capacitor 164 is charged now; diode 158 becomes conductive and connects resistor 156 in parallel with resistor 154, so that the time constants just discussed become correspondingly smaller.

FIG. 6, graph (b), shows the pulses at reset input R of flip-flop 90, which set signal Q/ (FIG. 6, graph c) at output Q/ of flip-flop 90 to "high" in statically dominant fashion at startup when they have a high value. It is evident that, because of the above-described elevated time constant at startup, signals R (FIG. 6, graph b) have a shape between times L1 and t2 that is different from that atter time t2; in other words, because of the change in time constant already described, after time L2 these pulses take on more the shape of spike pulses.

Rotor Rotation Diagnostic Signals

It is often desirable for a fan automatically to issue a warning signal if its rotor cannot rotate, for example because a mouse has gotten into the fan and jammed it.

Capacitor 150 is provided for this purpose; it is charged and discharged via resistor 146 when motor 4 is running, since potential p142 (FIG. 4, graph c) at node 142 then continuously varies between high and low, thus creating at node 148 a sawtooth voltage p148 that is alternately greater and less than potential p124 at node 124—which, for example, is one-third of Vcc. The result is to create at output 131 of comparator 130 a square-wave signal p131 that is shown in FIG. 7, graph (b). This is conveyed to flip-flop 134 which is connected as a D flip-flop, and converted therein into a static high signal that is available at its output Q and is shown in FIG. 7, graph (c). This high signal Q is measurable at terminal 180, and indicates that fan 1 is rotating.

If motor 4 is jammed, the result of the close inductive coupling between the two phases 25, 26 is that the circuit acts and an oscillator, i.e. the two phases are now alternately switched ON and OFF at a relatively high frequency. (This frequency is approximately 2.5 times higher than the frequency achieved at operating speed.) This state is shown in FIG. 8. Here as well, potential p148 has the form of a sawtooth voltage, but at a higher frequency; as a result, potential p148 oscillates continuously about a high value that is greater than potential p124, so that when the motor is jammed, no square-wave pulses p131 (FIG. 7, graph b) are generated, and consequently potential p131 remains low. Output Q of D flip-flop 134 also remains low (cf. FIG. 8, graph c).

The following possibilities thus exist, depending on the position of switches 172, 176:

a) When switch 172 is closed, a signal corresponding to potential p131 is obtained at output 180, i.e. pulses when motor 4 is running, and no pulses when it is stationary.

b) When switch 176 is closed, what is obtained at output 180 is signal Q, which is high when the motor is running, and low when the motor is jammed.

By means of switches 172, 176, the customer can select the manner in which he or she would like to be informed about the operating status of motor 4. Alternatively, instead of switches 172, 176, it is possible to provide, during manufacture, for a permanent connection for the type of indication that the customer desires. If a microcontroller is used, the type of indication can optionally also be programmed.

Many other variants and modifications are, of course, also possible within the scope of the present invention. Therefore, the invention is not limited to the particular embodiments shown and described, but rather is defined by the following claims.

What is claimed is:

1. An electronically commutated motor (4) comprising:

a permanent-magnet rotor (28);

a stator (14) having two winding phases (25, 26), of which, during one rotor rotation of 360° el., firstly current is delivered to a first one (25) of said winding phases within a first rotation angle range via an associated first semiconductor switch (68), and within a subsequent second rotation angle range, current is delivered to the other (26) of said winding phases via an associated second semiconductor switch (70);

a commutation apparatus for alternately switching on the first semiconductor switch (68) and the second semiconductor switch (70), which comprises a bistable multivibrator (FF90) whose switching state is controlled, via at least one comparator (126, 128), by a voltage that is induced by the permanent-magnet rotor (28) in that winding phase (25 or 26) which, in the instantaneous rotation angle region of the rotor (28), is not being supplied with current via its associated semiconductor switch (68 or 70).

2. The motor of claim 1, wherein the bistable multivibrator (FF90) has an electrical preferred position which is assumes upon switching on, in order to supply current, during the switching-on operation, to a predetermined winding phase (26).

3. The motor of claim 2, further comprising a least one permanent magnet provided on the stator, in order, when the motor is in a currentless state, to rotate the rotor (14) into a predetermined rotational position or into one of a plurality of predetermined rotational positions.

4. The motor of claim 1, wherein
a voltage induced in a currentless winding phase is transformed, via a pulse-shaper stage, into a switching pulse for triggering switchover to the bistable multivibrator (FF90).

5. The motor of claim 1, further comprising
a current limiter (78) which limits current (I) through the winding phases (25, 26) to a predefined value.

6. The motor of claim 5, wherein
the current limiter (78) is deactivated, during a predefined time period after the motor (4) is switched on, in order to allow an increased starting current (200).

7. The motor of claim 5, further comprising
a switching member (76), which is switched on during a predefined time period after the motor (4) is switched on thus bypassing the current limiter (78) in order to allow an increased starting current.

8. The motor of claim 5, wherein
the semiconductor switches are power transistors (68, 70); and each power transistor has, associated with it, a transistor (80, 83) which becomes more conductive as the motor current (I) increases and, thus reducing the base current of the power transistor (68, 70) associated with it, so as to thereby keep the motor current (I) substantially constant.

9. The motor of claim 1, wherein
one winding phase (26) has at least a 10% lower ohmic resistance than the other winding phase (25).

10. The motor of claim 9, wherein
the voltage occurring during operation at a winding phase (25, 26) is transformed into a substantially square-wave signal [FIGS. 4(b), 4(c)], and the switchover of the bistable multivibrator (FF90) is controlled by an edge of that square-wave signal.

11. The motor of claim 1, wherein
a terminal (180) is provided at which, when the motor has been switched on, a signal can be picked up whose value depends on whether or not the motor is rotating.

12. The motor of claim 1, wherein
the multivibrator (FF90) has a dominant input (R) to which, as the motor is switched on, a switch-on signal is applied, which causes a predetermined winding phase (26) to be switched on.

13. The motor of claim 12, wherein
the predetermined winding phase (26), which is energized as the motor is switched on, is associated with at least one predetermined rotational position of the rotor (28) which the latter assumes when the motor (4) is in a currentless state, in order to cause the rotor (28) to start in a desire rotation direction.

14. An electronically commutated motor (4) comprising
a permanent-magnet rotor (28);
a stator (14) having two winding phases (25, 26), of which, during one rotor rotation of 360° el., firstly current is delivered to a first one (25) of said winding phases within a first rotation angle range via an associated first semiconductor switch (68) and, within a subsequent second rotation angle range, current is delivered to the other (26) of said winding phases, via an associated second semiconductor switch (70);
a commutation apparatus for alternately switching on the first semiconductor switch (68) and the second semiconductor switch (70),
wherein, in accordance with the invention, the ohmic resistance values of the two winding phases (25, 26) differ by at least 10%, so that one winding phase (25) is high-resistance and one winding phase (26) is low-resistance; and
the commutation apparatus (90) is configured such that, as the motor (4) is switched on, it first switches on the semiconductor switch (70) associated with the low-resistance winding phase (26).

15. The motor of claim 14, further comprising
a current limitation system (78) which, when the motor (4) is in operation, limits current (I) through the winding phases (25, 26) to a substantially identical value that is associated with a desired rotation speed of the motor.

16. The motor of claim 15, wherein
the current limitation system is briefly deactivated, after the motor is switched on, in order to achieve an increased starting current.

17. The motor of claim 16, further comprising
a timing member (132, 164, 166) adapted t be activated by the switching-on of the motor and to deactivate the current limiting system (78) during a predefined time period.

18. The motor of claim 17, wherein
the timing member (132, 164, 166), in its activated state, modifies the time constant of an RC circuit (144, 154, 156) associated with the commutation apparatus (90) so that, as the motor (4) is switched on, a current flows first through the low-resistance winding phase (26), said current not being limited by the current limitation system (78) when the current limitation system is deactivated.

19. The motor of claim 14, further comprising
a bistable multivibrator (FF90) whose switching state is controlled by a voltage that is induced by the permanent-magnet rotor (28) in that one of said winding phases (25 or 26) which, in the instantaneous rotation angle range of the rotor (28), is not being supplied with current via its associated semiconductor switch (68 or 70).

20. The motor of claim 19, wherein
the multivibrator (FF90) has a dominant input (R) to which, as the motor is switched on, a switch-on signal is applied which causes the low-resistance winding phase (26) to be switched on.

21. The motor of claim 14, wherein
the low-resistance winding phase (26), which is energized as the motor is switched on, is associated with at least one predetermined rotational position of the rotor (28) which the latter assumes when the motor (4) is in a currentless state, in order, by energization of that low-resistance winding phase (26), to cause the rotor (28) to start in a desired rotation direction.

22. The motor of claim 1, wherein
at least one permanent magnet (8) is provided on the stator in order, when the motor is in the currentless state, to rotate the rotor (14) into a predetermined rotational position or into one of a plurality of predetermined rotational positions.

23. The motor of claim 1, wherein said motor is a claw pole motor (4).

24. The motor of claim 14, further comprising
at least permanent magnet (8) provided on the stator, in order, when the motor is in a currentless state, to rotate the rotor (14) into a predetermined rotational position or into one of a plurality of predetermined rotational positions.

25. The motor of claim 14, wherein said motor is a claw pole motor (4).

* * * * *

UNITED STATES PATENT AND TRADEMARK OFFICE
CERTIFICATE OF CORRECTION

PATENT NO. : 6,429,615 B2
DATED : August 6, 2002
INVENTOR(S) : Fritz Schmider et al.

It is certified that error appears in the above-identified patent and that said Letters Patent is hereby corrected as shown below:

<u>Title page,</u>
Item [75], Inventors, "Homberg" should be -- Hornberg --.

<u>Column 1,</u>
Line 46, "." should be -- ; --.

<u>Column 2,</u>
Line 10, "there" should be -- these --.
Line 16, "coil former" should be -- winding body --.

<u>Column 3,</u>
Line 12, "disclosed" should be -- defined --.
Line 12, "EP 0 908 030" should be -- EP 0 908 630 --.
Line 15, "," after "695 & 271" should be -- . --.
Line 61, "1" should be -- I --.
Line 63, "or" should be -- of --.

<u>Column 4,</u>
Line 6, "control" should be -- regulating --.

<u>Column 5,</u>
Line 40, "109" should be -- 108 --.
Line 42, "divide" should be -- divided --.
Line 43, after "example" -- , -- should be inserted.

<u>Column 6,</u>
Line 13, "(a)" should be -- (e) --.
Line 21, "period" should be -- phase --.
Line 28, "16V" should be -- +16V --.
Line 49, "35, 36" should be -- 25, 26 --.
Line 56, "0" should be -- 8 --.
Line 62, after "t2" "," should be -- . --.

<u>Column 7,</u>
Line 18, "O/or" should be -- Q/of --.
Line 25, insert -- . -- at end of sentence.
Line 30, "↓" should be -- * --.
Line 34, "period" should be -- phase --.
Line 46, "L1" should be -- t1 --.
Line 46, "atter" should be -- after --.
Line 48, "L2" should be -- t2 --.

UNITED STATES PATENT AND TRADEMARK OFFICE
CERTIFICATE OF CORRECTION

PATENT NO.   : 6,429,615 B2
DATED        : August 6, 2002
INVENTOR(S)  : Fritz Schmider et al.

It is certified that error appears in the above-identified patent and that said Letters Patent is hereby corrected as shown below:

Column 9,
Line 3, after "stage" ";" should be -- , --.
Line 4, "to" should be -- of --.
Line 21, "83" should be -- 82 --.
Line 30, after "voltage" -- [Fig. 4(h)] -- should be inserted and "a" should be -- one --.

Column 10,
Line 16, "t" should be -- to --.
Line 17, "to deactivate" should be -- which deactivates --.
Line 21, "its" should be -- the --.
Line 59, after "least" -- one -- should be inserted.

Signed and Sealed this

Twenty-fifth Day of October, 2005

JON W. DUDAS
*Director of the United States Patent and Trademark Office*